United States Patent

[11] 3,628,150

[72] Inventor Alfred R. Ditthardt
Skokie, Ill.

[21] Appl. No. 60,472
[22] Filed Aug. 3, 1970
[45] Patented Dec. 14, 1971
[73] Assignee Zenith Radio Corporation
Chicago, Ill.

[54] SELECTIVE PAGING SYSTEM
8 Claims, 3 Drawing Figs.

[52] U.S. Cl. .......... 325/55, 325/64, 325/477, 329/111, 340/311
[51] Int. Cl. .......... H04b 1/00
[50] Field of Search .......... 178/66, 88; 325/30, 45, 52, 55, 62–65, 320, 344, 349, 427, 473, 477, 484, 488; 329/111, 126; 340/164, 311, 312

[56] References Cited

UNITED STATES PATENTS 2,811,708 10/1957 Byrnes et al. .......... 325/55

*Primary Examiner*—Richard Murray
*Assistant Examiner*—Albert J. Mayer
*Attorneys*—John J. Pederson and R. A. Blackstone

ABSTRACT: A paging communication system for selectively signaling any of a plurality of individual paging receivers by transmitting a carrier-wave signal frequency modulated in accordance with a pulse-train signal coded to identify the receiver on call to cause such receiver to produce an alert signal. Each of the receivers has a low-pass filter with a cutoff frequency substantially equal to twice the repetition rate of the coded pulse-train modulating signal for converting the detected calling-code signal to a substantially noise-free continuous-wave signal having different amplitude levels reflecting the code represented by the detected signal. The repetition rate of the modulating signal is made substantially equal to 100 hertz.

Inventor
Alfred R. Ditthardt
By R.A. Blackstone
Agent

SELECTIVE PAGING SYSTEM

BACKGROUND OF THE INVENTION

Selective paging systems are useful in many applications including two-way radio communications between a base station and a number of fixed or mobile remote stations. The selective paging feature permits exclusive communication between the base station and a selected one of the remote two-way receivers. A somewhat simpler application consists of merely a one-way signaling operation in which a coded signal is transmitted generally to the area in which the paging receivers are located but only the individual receiver uniquely responsive to the selected code signal is activated to produce an alert signal such as an audible tone or visible light.

Important design considerations for a selective paging system include maximizing the number of possible receivers in the system to thereby efficiently use the relatively narrow frequency spectrum available, minimizing the time required to page each unit so that more units may be paged within a specified period of time, increasing the accuracy of the system so that the desired receiver is positively and exclusively signaled, and maximizing the signal-to-noise ratio in order to maximize the area of effective coverage.

Conventional paging systems have long employed a pocket-sized receiver unit having a frequency-selective vibrating-reed type decoder which actuates an alarm in response to the reception of a carrier signal modulated with a single tone having a particular frequency or several tones in a coded combination of different frequencies. The reed device has a relatively sharp frequency response, thus permitting closely adjacent tone frequencies and a satisfactory signal-to-noise ration. Hence, paging transmitters operating at conventional power levels are capable of paging a reasonable number (approximately 5,000) of receivers throughout a comparatively large area by such a system, even if the ambient radiofrequency noise level is rather high as it is in most metropolitan areas.

Vibrating reed systems, however, have the obvious disadvantage of requiring the use of a multiplicity of frequencies in an already overcrowded frequency spectrum. Consequently, such systems require rather complicated base station transmitter encoding equipment in order to provide the capacity of calling a large number of remote stations. In addition, their calling rate is usually rather slow (e.g., one call per second). Moreover, the vibrating-reed devices are rather prone to malfunction when subjected to conditions of vibration or shock. Inevitably, shaking due to vehicular motion or a sharp blow such as when the pocket-size receiver is accidentally dropped causes the receiver to provide a false alarm or even to become completely disabled.

In an attempt to improve paging systems, designers have more recently gone to a digital encoder-decoder approach, with the individual receivers using solid-state technology to decipher a coded pulse-train message and produce the alert signal. In view of available binary coding techniques, a digital system has the obvious advantages of miniature size, a greatly increased number of individual code signals within a fixed frequency spectrum, a much faster calling rate, and a more stable device which is relatively immune to malfunction resulting from vibration or shock to the receiver.

A problem that has not been satisfactorily solved with the digital system, however, is that of obtaining maximum area of coverage without either missing calls or rendering the receiver susceptible to significant false triggering; that is, the increased bandwidth employed to accommodate the faster digital calling rates and the rectangular-shaped code pulses has decreased the signal-to-noise ratio of the receiver and increased the likelihood of interference or false actuation by extraneous noise signals. This is true because the noise level at a particular frequency is directly proportional to the square of the frequency; thus, the higher the calling rate, the higher the upper frequency limit of the receiver circuitry and the much greater the noise level. It therefore becomes much more difficult for the receiver to distinguish signal from noise, especially at locations remote from the transmitter where the signal strength is relatively weak and in urban areas where the ambient noise level is rather high. To overcome this problem, designers have resorted to highly sophisticated, narrow-bandwidth tuned circuits to pass only the desired signals and exclude the rest. In addition, some systems have even resorted to repetition of the coded message or "word" a given number of times in order to achieve an acceptable false-triggering immunity. The tuned circuits, however, especially at the frequencies typically employed, are rather complex, expensive, and even bulky because of the relatively large physical size of the inductances required in these circuits. Similarly, repetition of the code word not only entails additional decoding circuitry which increases the expense and battery drain of the portable receiver but also reduces the system's maximum calling rate.

It is therefore a primary object of the invention to provide a new and improved selective paging system having a relatively simple construction and efficient operation.

It is a more specific object of the invention to provide such a new and improved selective paging system having an increase signal-to-noise ratio to thereby increase the area of coverage and decrease the incidence of missed calls and false triggering.

SUMMARY OF THE INVENTION

In accordance with the invention, a paging communication system for selectively signaling any of a plurality of individual paging receivers by transmitting a carrier-wave signal frequency modulated in accordance with a pulse-train signal coded to identify the receiver on call to cause such receiver to produce an alert signal comprises means for selectively generating any of a plurality of pulse-train calling-code signals, each having a repetition rate of approximately 100 hertz, and each uniquely identified with a different individual paging receiver. A transmitter coupled to the generating means and responsive to the selected calling-code signal is provided for developing the frequency modulated carrier-wave signal and transmitting it to the receivers. A paging receiver for such a system comprises means for receiving the transmitted frequency modulated carrier-wave signals and means coupled to the receiving means for detecting the received calling-code signal. The receiver is also provided with means comprising a low-pass filter coupled to the detecting means and having a cutoff frequency substantially equal to twice the repetition rate for converting the detected calling-code signal to a substantially noise-free continuous-wave signal having different amplitude levels reflecting the code represented by the detected signal. Means coupled to the low-pass filter and responsive to the different amplitude levels of the continuous-wave signal are provided for developing a digital signal containing the code. In addition, each receiver has digitally responsive decoding means coupled to the digital signal developing means for recognizing the code represented by the digital signal and for providing a recognition signal in response thereto, and indicating means responsive to the recognition signal for providing the alert signal.

BRIEF DESCRIPTION OF THE DRAWING

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

DESCRIPTION OF THE PREFERRED EMBODIMENT

Figure 1:
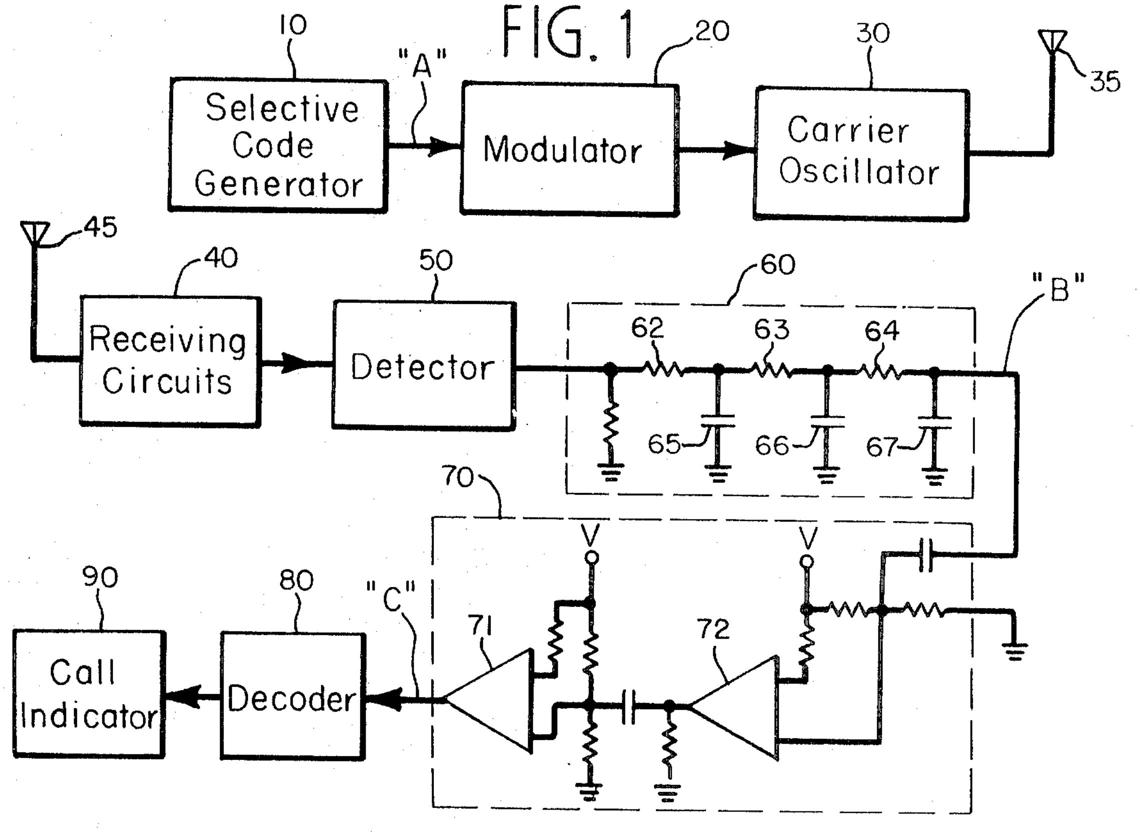
FIG. 1 is a schematic diagram of a preferred embodiment of the invention.

With reference to FIG. 1, there is shown in block diagram form a selective paging communications system constructed in accordance with the invention. A selective code generator 10 is provided to generate any of a plurality of pulse-train calling-code signals each uniquely identified with a different individual paging receiver. The calling-code signals are applied to a modulator 20 to frequency modulate the radiofrequency output of a carrier oscillator 30. An illustrative example of a coded pulse-train modulating signal is graphically represented by "A" in FIG 2. Modulator 20 is preferably a frequency-shift-keying (FSK) frequency-modulation device and may be of any desired conventional construction. A transmitting antenna 35 enables the frequency-modulated carrier-wave signal thus generated to be transmitted to the general area in which the individual paging receivers are situated. In a typical application of the system, the carrier frequency is 150 megahertz and the FSK deviation frequency is ±5 kilohertz.

Selective code generator 10 may be of any known construction, including a binary-coded pulse-train generating device, to provide the coded signal "A" for modulator 20. In accordance with the invention, the fundamental repetition rate of the coded pulse-train signal is made equal to approximately 100 hertz. Although prior art paging communication systems have consistently used much higher repetition rates, it has been found that, in accordance with the invention, frequencies in the range of 50 to 300 hertz provide unexpected advantages which are hereinafter discussed in greater detail.

Unlike conventional digital paging systems which employ a fundamental repetition rate of from 1,000 to 5,000 hertz, a system constructed in accordance with the invention utilizes a much lower repetition rate of 100 hertz, for example, to not only afford a much better signal-to-noise ratio, as described below in greater detail, but also to enable the selective calling feature to be combined with a voice-communication mobile-radio system without interference therewith. The coded information neatly "fits in" just below the lower frequency limit of the voice-communication bandwidth. Furthermore, although at first glance the system of the invention may appear to significantly sacrifice the calling rate in order to obtain the aforementioned advantages, this is not true because the greatly increased signaling accuracy of the invention resulting from the substantially increased signal-to-noise ratio permits a receiver to be positively and exclusively signalled by the transmission of a single code "word." Thus, while a conventional digital paging system may be capable of transmitting 25 code "words" of a given length per second and a system constructed in accordance with the invention only five equivalent "words" per second, the conventional system must repeat the "word" five times in order to obtain signaling accuracy comparable to that provided by the system of the invention. A system constructed in accordance with the invention, therefore, has substantially the same effective calling rate as a conventional system but with the additional advantages of a greatly increased signal-to-noise ratio, less complex circuitry, lower power requirements, and greater adaptability with other communication systems such as two-way radio.

A typical remote receiver circuit is also shown in FIG. 1 comprising a receiving antenna 45 which intercepts the radiofrequency carrier wave and converts it into an electrical signal for application to receiving circuits 40. Receiving circuits 40 may comprise essentially conventional circuits including an RF amplifier, local oscillator, mixer, IF amplifier, and whatever other circuits that are deemed necessary and suitable for presenting a proper signal to a detector 50, which detects the received calling-code signal.

Also in accordance with the invention, means including a low-pass filter 60 coupled to the detector and having a cutoff frequency substantially equal to twice the fundamental repetition rate of the calling-code signal are provided for converting the detected calling-code signal to a substantially noise-free continuous-wave signal having different amplitude levels reflecting the code represented by the detected signal. Low-pass filter 60 may be of any known construction, one of the simplest of which is illustrated in FIG. 1. A resistive-capacitive network comprising resistors 61, 62, 63 and 64 and capacitors 65, 66 and 67 simply and economically provides the required cutoff frequency. The cutoff frequency for a low-pass filter is customarily defined as that frequency whose amplitude is three decibels below that of the zero frequency. Making the cutoff frequency substantially equal to twice the fundamental repetition rate has been found to be especially well suited for passing the essential code signal components, with a minimal amount of noise, and excluding all appreciable amounts of extraneous signals. For the above-mentioned fundamental repetition rate example of 100 hertz, there are some essential 400 hertz and even 1,000 hertz components and they are adequately passed by a conventional low-pass filter having a cutoff frequency of 200 hertz and a typical rolloff characteristic. What is passed, in effect, is a relatively low frequency sine wave having a frequency roughly corresponding to the fundamental repetition rate of the pulse-train signal and with the amplitude of each sine-wave cycle corresponding to the presence or absence of a pulse (or "bit") in the pulse-train signal. This low-pass filtered output signal is graphically illustrated by "B" in FIG. 2.

Figure 2:
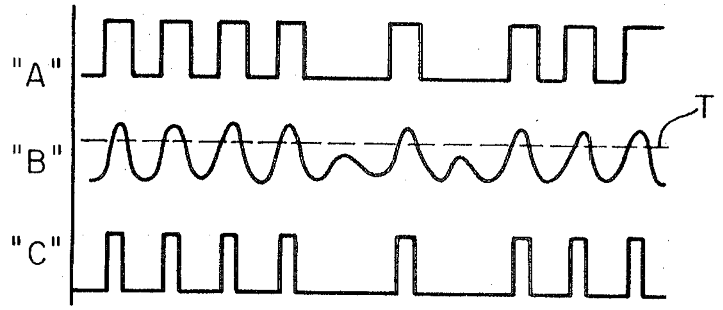
FIG. 2 is a graphical representation of some of the waveforms produced by the system shown in FIG. 1.

To enhance the decoding of the detected and filtered coded pulse-train signal, a wave-shaping circuit 70 is provided to substantially reconstitute the rectangular-shaped pulses ("A"), as initially generated in the transmitter by selective code generator 10, from signal "B" to provide signal "C" which is also graphically illustrated in FIG. 2. For this purpose, wave-shaping circuit 70 may comprise a pair of amplifiers 71 and 72 which are operated in the nonlinear portions of their characteristic curves so as to convert the sine-wave signal "B" to the rectangular-wave signal "C." Amplifier 72, for example, may be a threshold detector which is turned on only in response to a signal greater than a predetermined minimum level (e.g., that level represented in FIG. 2 by dashed line T), while amplifier 71 may be used to provide additional gain so that a satisfactory digital signal containing the calling code is presented to decoder 80.

Decoder 80 may be of any of the many known constructions for processing the coded pulse-train signal and recognizing the unique code "word" assigned to the individual receiver. If decoder 80 does recognize this unique signal, it provides a recognition signal to a call indicator 90 which in turn provides some sort of alert signal such as a light or audible tone.

Figure 3:
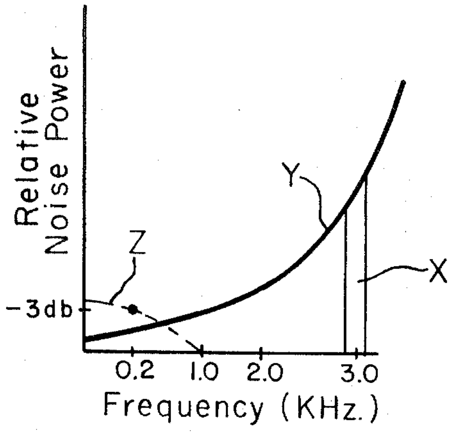
FIG. 3 is a graphical representation of the frequency response of the low-pass filter portion of the embodiment shown in FIG. 1.

The relation between noise power and modulating frequency is graphically illustrated by curve Y in FIG. 3. The area under the curve Y represents the total amount of noise power. Note that the relative noise power increases in proportion to the square of the modulating frequency. The region under curve Y designated by X approximates a typical frequency response for a vibrating-reed device. Also note that because of the reed's relatively narrow frequency response, a rather small amount of noise is incurred. For a conventional digital system to even approach the frequency response of a vibrating-reed device, and thereby obtain an equivalent signal-to-noise ratio, very sophisticated and complex electronic filtering is required. In accordance with the invention, however, the modulating signals are confined to the relatively low frequencies enclosed within the pass band of low-pass filter 60 as indicated on the graph by dashed line Z to thereby simply and economically obtain a frequency response broad enough to pass the essential components of the desired signal yet passing no more noise power than that passed by a vibrating-reed device. Consequently, the invention provides greater coverage and accuracy than conventional digital systems at a minimum cost and lower power requirements (i.e., less battery drain for a portable receiver). The invention also provides a faster calling rate than conventional vibrating-reed devices while achieving a signal-to-noise ratio characteristic at least as good as that of the reed device. Moreover, the filtering technique is extremely economical and requires a minimum amount of size since the only additional structure required by the invention to obtain these advantages is a rather unsophisticated, broadly tuned low-pass filter network.

Thus there has been described a new and improved digital selective paging system having a relatively simple construction and efficient operation. Not only does the system take advantage of modern solid-state technology, it also provides a new and improved digital selective paging system having an increased signal-to-noise ratio to thereby increase the area of coverage and decrease the incidence of false triggering. Moreover, these highly advantageous results are obtained with no appreciable increase in receiver power requirements to thereby make the invention very desirable for portable, battery-operated receiver applications.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A paging communication system for selectively signalling any of a plurality of individual paging receivers by transmitting a carrier-wave signal frequency modulated in accordance with a pulse-train signal coded to identify the receiver on call to cause such receiver to produce an alert signal, said system comprising:

means for selectively generating any of a plurality of pulse-train calling-code signals, each having a repetition rate of approximately 100 hertz, and each uniquely identified with a different individual paging receiver;

a transmitter coupled to said generating means and responsive to the selected calling-code signal for developing said frequency modulated carrier-wave signal and transmitting it to said receivers;

and a plurality of individual paging receivers each comprising a. means for receiving the transmitted frequency modulated carrier-wave signals;

b. means coupled to the receiving means for detecting the received calling-code signal;

c. means comprising a low-pass filter coupled to said detecting means and having a cutoff frequency substantially equal to twice said repetition rate for converting the detected calling-code signal to a substantially noise-free continuous-wave signal having different amplitude levels reflecting the code represented by the detected signal;

d. means coupled to said low-pass filter and responsive to the different amplitude levels of said continuous-wave signal for developing a digital signal containing said code;

e. digitally responsive decoding means coupled to said digital signal developing means for recognizing the code represented by said digital signal and for providing a recognition signal in response thereto;

f. and indicating means responsive to said recognition signal for providing said alert signal.

2. A paging communication system according to claim 1, in which said converting means essentially consists of a low-pass filter having a cutoff frequency of 200 hertz.

3. A paging communication system according to claim 1, in which said digital signal developing means comprises a threshold detector.

4. A paging communication system according to claim 1, in which said digital signal developing means essentially reconstitutes said pulse-train calling-code signal.

5. A receiver adapted for use with a paging communication system which selectively signals any of a plurality of such receivers by transmitting a carrier-wave signal frequency modulated in accordance with a pulse-train signal having a repetition rate of approximately 100 hertz and coded to identify the receiver on call to cause such receiver to produce an alert signal, said receiver comprising:

means for receiving the transmitted frequency-modulated carrier-wave signal;

means coupled to the receiving means for detecting the received calling-code signal;

means comprising a low-pass filter coupled to said detecting means and having a cutoff frequency substantially equal to twice said repetition rate for converting the detected calling-code signal to a substantially noise-free continuous-wave signal having different amplitude levels reflecting the code represented by the detected signal.

means coupled to said low-pass filter and responsive to the different amplitude levels of said continuous-wave signal for developing a digital signal containing said code;

digitally responsive decoding means coupled to said digital signal developing means for recognizing the code represented by said digital signal and for providing a recognition signal in response thereto;

and indicating means responsive to said recognition signal for providing said alert signal.

6. A receiver according to claim 5, in which said converting means essentially consists of a low-pass filter having a cutoff frequency of 200 hertz.

7. A receiver according to claim 5, in which said digital signal developing means comprises a threshold detector.

8. A receiver according to claim 5, in which said digital signal developing means essentially reconstitutes said pulse-train calling-code signal.

* * * * *